United States Patent [19]

Flotow

[11] Patent Number: 4,598,808
[45] Date of Patent: Jul. 8, 1986

[54] NOISE SUPPRESSION DEVICE FOR CONSTANT RUNNING CLUTCH RELEASE BEARING

[75] Inventor: Richard A. Flotow, Butler, Ind.

[73] Assignee: Dana Corporation, Toledo, Ohio

[21] Appl. No.: 647,249

[22] Filed: Sep. 4, 1984

[51] Int. Cl.$^4$ .............................................. F16D 23/14
[52] U.S. Cl. ................................. 192/98; 192/110 B; 192/70.29
[58] Field of Search ............... 192/30 V, 89 B, 98, 192/110 B, 70.29; 384/513, 535, 536, 592

[56] References Cited

U.S. PATENT DOCUMENTS

| | | | |
|---|---|---|---|
| 1,788,864 | 6/1927 | Geistert | 192/110 B X |
| 1,790,284 | 1/1931 | Reed | 192/98 |
| 2,076,425 | 4/1937 | Brock | 192/68 |
| 3,003,831 | 10/1961 | King et al. | 384/536 |
| 3,241,643 | 3/1966 | Montgomery | 192/110 B |
| 3,365,040 | 1/1968 | Pitner | 192/98 |
| 3,486,598 | 12/1969 | Wells | 192/98 |
| 3,963,105 | 6/1976 | Ernst et al. | 192/98 |
| 4,026,399 | 5/1977 | Ladin | 192/98 |
| 4,213,522 | 7/1980 | Blaylock | 192/98 |
| 4,280,607 | 7/1981 | Blaylock | 192/98 |
| 4,448,294 | 5/1984 | Brandenstein et al. | 192/30 V |

Primary Examiner—Rodney H. Bonck
Assistant Examiner—James J. Merek
Attorney, Agent, or Firm—Frank B. McDonald

[57] ABSTRACT

A friction clutch assembly includes a noise suppression device for a constant running bearing fixed to the transmission input shaft of the clutch assembly. The friction clutch system includes a plurality of rotatable clutch release levers, and in a preferred form the noise suppression device is defined by cylindrical members affixed to drive pins extending axially of the release bearing for engagement with the inner end of the levers. The resilient nature of the cylindrical members operates to suppress the noise which otherwise normally occurs by virtue of direct contact of the metallic lever ends with the metallic drive pins.

8 Claims, 4 Drawing Figures

NOISE SUPPRESSION DEVICE FOR CONSTANT RUNNING CLUTCH RELEASE BEARING

BACKGROUND OF THE INVENTION

This invention relates to friction clutch assemblies including the type having constant running release bearings. More particularly, the invention relates to a noise suppression device for release bearings utilizing drive pins in constant engagement with inner ends of clutch levers.

In prior art clutch assemblies of the type including constant running release bearings, the direct engagement of the lever inner ends with the drive pins or bosses extending from the release bearings associated therewith does not afford a noise control mechanism, and hence contributes to the overall noise level generated by operation of the clutch. To the extent that efforts have been directed to minimizing noise levels associated with operation of clutches, none of such efforts have been directed to the pin and inner lever interface of the clutch assembly.

SUMMARY OF THE INVENTION

The invention disclosed herein provides a noise suppression device at the interface of the constant running release bearing drive pin and the inner ends of the clutch levers. In a preferred form, the invention provides cylindrical non-metallic resilient members externally fixed about each metallic drive pin for direct engagement of the members with rotating metallic lever inner ends. Each cylindrical member is mechanically contained between a head portion of the pin and an outer cage portion of the release bearing assembly.

Also in a preferred embodiment, the cylindrical member may be made of polytetrafluroethylene, preferably of a glass-filled type, or alternatively may be made of nylon or some other durable plastic. To the extent that the contact between the lever inner ends and the cylindrical member is constant, such resilient materials have been quite effective in reduction of noise levels in this particular region of the clutch assembly.

DETAILED DESCRIPTION OF A PREFERRED EMBODIMENT

Figure 1:
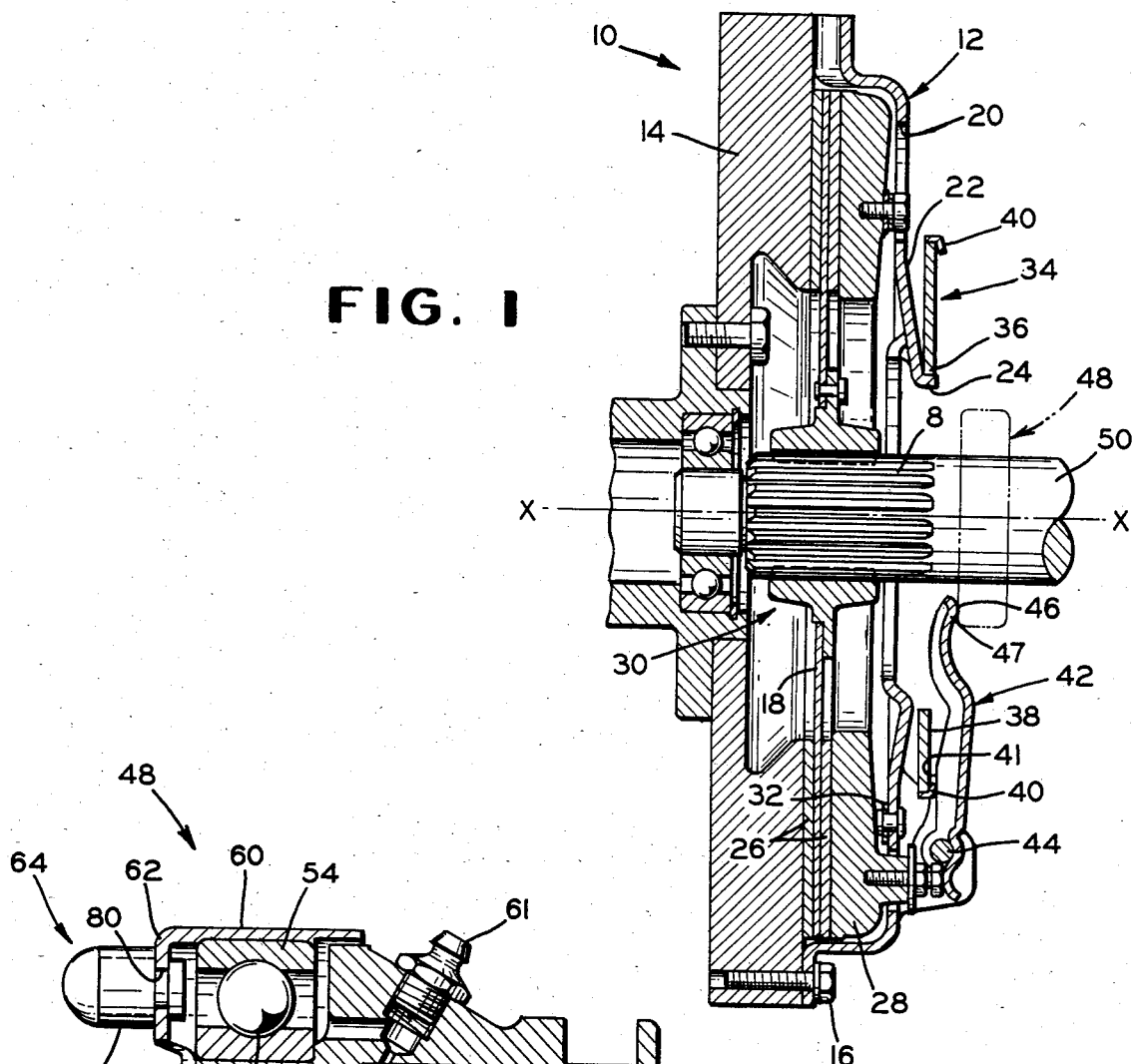
FIG. 1 is a cross-sectional view of a friction clutch assembly which includes a preferred embodiment of the present invention.

Referring initially to FIG. 1, a friction clutch 10 incorporates a preferred embodiment of the present invention. The clutch 10 includes a cover 12 secured to a flywheel 14 by a plurality of circumferentially spaced cover bolts 16. A driven friction disc 18 is slidably secured on a splined portion 8 of a transmission input shaft 50 by means of a hub 30. A pressure plate 28 affixed to the cover 12 by drive straps 32 extending through cover openings 20 bears against the axially movable friction disc 18 to force the friction facings 26 thereof tightly between the flywheel and pressure plate members to effect clutch engagement.

Release levers 42 operate to pull the pressure plate 28 away from or rightwardly of (as viewed in FIG. 1) the friction disc 18. Thus, the pressure plate 28 is moved axially relative to the cover 12 into and out of engagement by means of the levers 42, which are themselves urged leftwardly by means of a release bearing 48 axially slidable on the transmission input shaft 50. Inner ends 46 of the release levers 42 engage lever drive members 64 (only one of which is shown; see FIG. 2) as will be described in further detail hereinbelow.

The cover 12 contains an angular ramp member 22 which includes a lip 24. Circumferentially positioned adjacent the ramp member and having an inner peripheral portion 36 engaging the lip 24, is a spring washer 34 which operates to normally urge the levers into a clutch-engaged position. The release bearing 48 bears leftwardly against the inner ends 46 of the levers 42, and hence operates to flatten or place the spring washer 34 under compression. In this manner, the spring force of the normally engaging spring washer is overcome by conventional clutch pedal effort.

The spring washer 34 has an outer peripheral portion 40 which is depressed leftwardly by a bearing portion 41 of the lever 42 as the inner end 46 of the lever is urged leftwardly by the release bearing 48. The cone shaped flexible body 38 of the spring washer 34 is held in a clutch release position until pedal effort is released. Each lever 42 moves about a lever pivot pin 44, which is secured to the clutch cover and hence acts as a lever fulcrum point.

Figure 2:
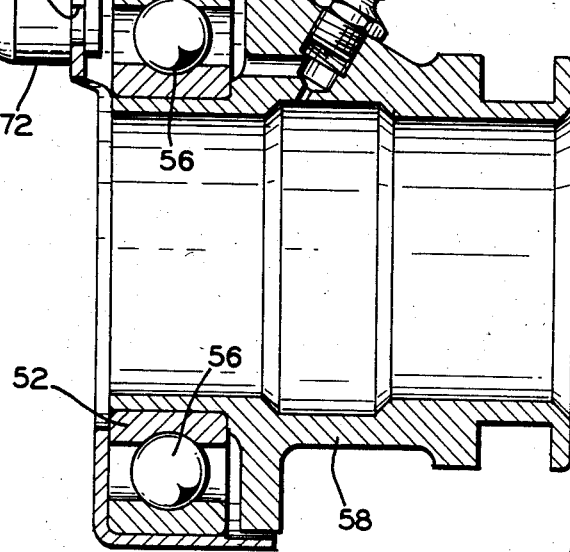
FIG. 2 is a cross-sectional view of a release bearing assembly which shows a preferred embodiment of the present invention in specific detail.

Referring now to FIG. 2, the release bearing 48 is shown in greater detail The release bearing 48 includes inner and outer races 52 and 54, and a plurality of balls 56 in rotatable engagement with the races to allow relative movement between outer and inner races. An inner cage 58 is non-rotatably secured to the inner race 52, while an outer cage 60 is non-rotatably secured to outer race 54. The inner cage contains a grease fitting 61 for lubrication of the bearing balls and races. The outer race includes a plurality of projections 62 which support the afore-mentioned lever drive members 64. The members 64 project axially outwardly of the outer race and interdigitally between the levers 42 for establishing direct and constant engagement with the sides 47 of the inner ends 46 of the levers during clutch operation.

Figures 3, 4:
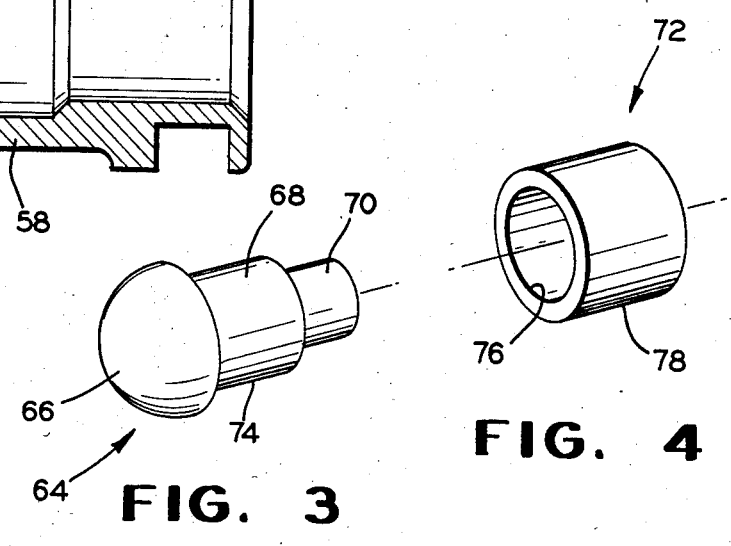
FIG. 3 is a perspective view of a drive pin utilized in the preferred embodiment of FIG. 2.
FIG. 4 is a perspective view of a resilient cylindrical member employed with the drive pin of FIG. 3.

Referring now particularly to FIGS. 3 and 4, it will be seen that each lever drive member 64 in the preferred embodiment comprises a pin-like apparatus having a hemispherically formed head 66 and a shank portion 68 affixed thereto. The hemispherical shape of the heads 66 facilitates installation of the release bearing 48. Thus if a head is initially positioned directly over a lever 46, the head will tend to slide around and into intended position alongside the lever. The outside diameter 74 of the shank portion is preferably smaller than the radial diameter of the head portion 66. As per FIG. 2, this provides for a positive mechanical securement of a non-metallic resilient annular, or cylindrically-shaped body 72 over the shank portion 68 between the head 66 and the projection 62. Preferably, the body 72 is formed of a polytetrafluroethylene or other resilient but durable plastic material. Also, the inside diameter 76 of the cylindrical body 72 is approximately equal to the outside diameter 74 of the shank portion of the pin to ensure at least a slight frictional engagement between those members. In the preferred embodiment, the outside diameter of the resilient member 78 is approximately equal to the outside diameter of the head 66.

Finally, it will be seen that the drive pin 64 includes a rivet portion 70 affixed to the shank 68 opposite the head portion 66, which provides means for securement of the pin 64 to the projection 62 on the outer cage 60. Such securement may be made by means of a conventional tool which plastically deforms the rivet portion after insertion thereof into an aperture 80 in the projection 62.

Although only one preferred embodiment has been described and shown herein, numerous variations are envisioned to fall within the scope of the following claims.

What is claimed is:

1. In a friction clutch system including a plurality of clutch release levers, a release bearing assembly disposed for constant engagement with said levers, said bearing assembly including at least one drive means axially disposed for engagement with at least one of said levers; an improvement wherein said drive means comprises a cylindrical body of resilient material for direct interdigital contact wtih said lever,
    said drive means further comprising a drive pin supporting said body of resilient material, said pin having a head,
    said release bearing assembly comprising an outer race, wherein said drive pin is anchored to said outer race.

2. The release bearing assembly of claim 1 wherein said body is mechanically retained between said head portion of said pin and said outer race of said release bearing assembly.

3. The release bearing assembly of claim 2 wherein said body of resilient material comprises a glass-filled polytetrafluroethylene.

4. The release bearing assembly of claim 3 wherein said drive pin includes a rivet portion, said rivet portion secured to said outer race by plastic deformation thereof.

5. The release bearing assembly of claim 2 wherein said material of said cylindrical member is nylon.

6. The release bearing assembly of claim 5 wherein said head portion of said pin is hemispherical.

7. The release bearing assembly of claim 6 wherein said cylindrical member has an outside diameter less than or equal to the diameter of said head portion of said pin.

8. A friction clutch system including a plurality of rotatable clutch release levers, a release bearing assembly disposed for constant engagement with said levers, said bearing assembly including drive means axially disposed for rotatable engagement of inner ends of said levers, said drive means comprising a body of resilient material secured thereto for direct contact with said lever ends, said drive means defining a drive pin including shank and head portions, said shank portion having a smaller diameter than said head portion, said body of resilient material comprising a cylindrical member externally fixed about said drive pin.

* * * * *